US008745639B2

(12) United States Patent
Graham, Jr. et al.

(10) Patent No.: US 8,745,639 B2
(45) Date of Patent: Jun. 3, 2014

(54) CONTROLLER AND METHOD TO BUILD A COMBINED WEB PAGE USING DATA RETRIEVED FROM MULTIPLE APIS

(75) Inventors: William W. Graham, Jr., San Francisco, CA (US); David Huang, Burlingame, CA (US)

(73) Assignee: CBS Interactive Inc., San Francisco, CA (US)

( * ) Notice: Subject to any disclaimer, the term of this patent is extended or adjusted under 35 U.S.C. 154(b) by 1095 days.

(21) Appl. No.: 12/716,759

(22) Filed: Mar. 3, 2010

(65) Prior Publication Data

US 2011/0161991 A1 Jun. 30, 2011

Related U.S. Application Data

(60) Provisional application No. 61/291,510, filed on Dec. 31, 2009.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................................ 719/328

(58) Field of Classification Search
None
See application file for complete search history.

(56) References Cited

U.S. PATENT DOCUMENTS

| 6,591,266 | B1 * | 7/2003 | Li et al. .................................. 1/1 |
| 7,451,403 | B1 * | 11/2008 | Srinivasan et al. ............. 715/763 |
| 7,503,052 | B2 * | 3/2009 | Castro et al. ................... 719/328 |
| 2008/0052729 | A1 | 2/2008 | Paul et al. |
| 2008/0228809 | A1 * | 9/2008 | Shan et al. ..................... 707/102 |
| 2009/0158304 | A1 | 6/2009 | Jiang |
| 2009/0172552 | A1 * | 7/2009 | Segel ............................. 715/733 |
| 2011/0087731 | A1 * | 4/2011 | Wong et al. .................... 709/204 |

* cited by examiner

*Primary Examiner* — Emerson Puente
*Assistant Examiner* — Kimbleann Verdi
(74) *Attorney, Agent, or Firm* — Marc S. Kaufman; Reed Smith LLP (57) ABSTRACT

Systems, devices, and methods for using an application program interface (API) client controller to build a model view include a requestor, an executor, a converter, and one or more web APIs. Developers can create web pages that are a collection of references to API queries. The requestor maps an API path to an API request or an API call. The executor executes the API request to an API to retrieve content data. The converter then converts the retrieved content data returned by the API request to a data structure. The retrieved content data (structure) can be stored in a memory device. Multiple content data structures may be requested and stored. The data structure or data structures are then inserted in a web page template to create a model view.

30 Claims, 7 Drawing Sheets

CONTROLLER AND METHOD TO BUILD A COMBINED WEB PAGE USING DATA RETRIEVED FROM MULTIPLE APIS

RELATED APPLICATION

This application claims the benefit of U.S. Provisional Application No. 61/291,510, filed Dec. 31, 2009, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This technology generally relates to building web pages, and more particularly to a parallel API client controller and method for automatically handling flow control to build a combined web page using data retrieved from a plurality of API requests.

BACKGROUND

The World Wide Web has become a primary source of communication amongst millions of individuals in recent years. Web sites provide collections of web pages that are accessed by individuals for entertainment, education, information exchange, and even online shopping. As a result, more and more businesses have turned to the Internet to market and advertise to potential customers, to disseminate information about their brands to the public, and to accept orders for their products and services.

Traditionally, business web sites were created by computer programmers who "hard coded" the web sites using a combination of programming languages compatible with HyperText Markup Language (HTML). These programmers would create the site by writing lines of software code describing how the web site should look and the content that the web site should contain. The software code would then be uploaded to a server, where it could be assembled into a number of web pages and accessed by visitors to the web site. Depending on the breadth of the site, it could often take many hours to generate a web site in this fashion. Furthermore, it was very expensive for businesses to maintain web sites over time due to the specialized knowledge needed by the programmer to create the various web pages.

As technology progressed and businesses realized the high value of Internet advertising, web sites became more advanced, with more expansive content, multiple linked web pages, and high-end graphics and videos. Due to the high costs involved in hiring web developers to program and code these advanced web sites, software companies created web site development programs capable of automating the web creation process. This software can be used to build web sites either from scratch or from pre-existing templates. For example, a user can select, display, and arrange various web objects, such as text, graphics, media, and the like, through the page, in a "what-you-see-is-what-you-get" fashion. Then, the software development program automatically codes the web page into HTML, without the use of a web developer. HTML provides a way to add structure to the web page documents by providing structural semantics for text such as headings, paragraphs, and lists as well as for links, and other items.

However, users of traditional web site development software face many difficulties. For instance, the user must establish precise uniformity of the web site despite the visual inaccuracies of the "drag and drop" format, requiring intense time, skill, and effort. For example, the user must ensure the correct proximity of display objects, alignment, and consistency of format. With respect to business web sites, the user has to ensure uniformity across multiple, even hundreds or thousands, of linked web pages. Furthermore, this traditional web site development software often does not have the level of complexity required by many of today's businesses that want to integrate advanced functions, such as real-time media, into their web sites. Thus, the web pages and web site could become out-of-date and inconsistent, deteriorating the look and feel of the company web presence, and thus the visitor's impression of the company.

In both preparing hard coding and in preparing web development software, a web software developer is needed to generate the web site in accordance with the objectives of the business. Typically, this means that editors, designers, and product managers, who have the most intimate understanding of the business, are not directly involved with the generation of the web site, and must relay this business information to the web developer. It may take a number of drafts and iterations before the editor or designer is satisfied that the web site created by the developer properly reflects the business desires and objectives for the web site.

SUMMARY

One example in the present disclosure is a parallel API (application program interface) client controller that provides a tool to build web sites when web page information is sourced from different APIs. In this context, an API is a defined set of Hypertext Transfer Protocol (HTTP) request messages, along with a definition of the structure of response messages, usually in an Extensible Markup Language (XML), JAVASCRIPT™ Object Notation (JSON) format, or similar structures. For a given web page being developed, a software web page developer can use the parallel API client controller, which allows the developer to configure various API requests that are needed to provide the different data necessary to assemble the web page. The parallel API client controller can be configured by the developer to alter the manner in which the model required by the web page is built.

In the examples below, systems and methods are provided for building a controller to build, integrate, and render pages of content. In a Model-View-Controller configuration, for example, the parallel API controller provides software developers and web developers with a controller to handle flow control and to build the Model required by the View (web page). The parallel API controller leaves the developer to develop the web page content. The parallel API controller can be configuration driven. The parallel API controller provides an easy-to-use and efficient manner to allow designers and editors direct control over the data available to the page, and allow for multiple party integrated-content pages. Further, the pages can have consistent layouts and formats, if desired, without the need for extensive programming.

In one example, a developer can use the API client controller and a model and leave the developer to focus upon developing the view or page template. The API client controller provides a way to create web pages that are based upon a collection of API requests. The data returned from the different API requests can then be used to create a model web page.

The examples in this application provide methods, systems, and media for configuring an API parallel controller to build a model required by a web page so that developers may integrate and dynamically build pages of content.

One example provides a method to build a controller framework for web sites when web page information is sourced from different APIs. In one example, a computer-implemented method uses an application program interface (API) client controller to build a model view. The method includes mapping an API path to an API request by a requestor device. The method further includes executing the API request to retrieve content by an executor device, retrieving content, and converting the retrieved content to a content data structure by a converter device. In this example, the method includes inserting the content data structure in a web page template and creating a model view based upon the inserted content data structure and the web page template.

In one example, the API path can be a uniform resource identifier (URI). Additionally, in one example, the API request can be an API call. The content can reside in an API database in one example. Further, converting the retrieved content to a content data structure can include converting the content data structure from an XML format to a JAVA™ Map object. The retrieved content can be stored in a memory device.

In one example, the method can also include determining a web page template to use in creating the model view based upon a characteristic of the content data structure. Further, the method can also stop execution of the API request to retrieve content after a predetermined amount of time.

In one example, the method can also include executing an additional API request to retrieve additional content, retrieving the additional content, converting the retrieved additional content to an additional content data structure, and inserting the additional content data structure in the web page template to create the model view. Further, executing the API request to retrieve content and executing the additional API request to retrieve additional content can be executed in parallel.

One example provides a system to build a controller for web sites when web page information is sourced from different APIs. In this example, the system can include a controller, a requestor, an executor, and a requestor executor. The system can also include a converter. The controller can be configured to handle requests for a given URI path pattern that matches the URI of the request. The requestor is a component that can be configured to map to a given API request that should occur. The executor is an interface for a number of components that is configured to execute a given action. Further, the requestor executor is a component that can be configured to make an API request to a given API for a configured requestor. The converter is a component that converts the data returned by the API calls to a data structure that can be easily consumed in the page templates and thereby provide a developer a convenient manner of building a web site when web page information is sourced from different APIs.

In one example, a computer readable medium has instructions stored on it for building and configuring an application program interface (API) client controller to build a model view. The computer readable medium includes instructions for mapping an API path to an API request by a requestor device. When executed by at least one processor, the instructions on the computer readable medium cause the processor to perform steps including executing the API request to retrieve content by an executor device, retrieving content, and converting the retrieved content to a content data structure by a converter device.

The instructions on the computer readable medium further cause the processor to perform steps including inserting the content data structure in a web page template and creating a model view based upon the inserted content data structure and the web page template. As above, in one example, the API path can be a uniform resource identifier (URI). Additionally, in one example, the API request can be an API call. The content can reside in an API database in one example. As indicated above, converting the retrieved content to a content data structure can include converting the content data structure from an XML format to a JAVA™ Map object. The retrieved content can be stored in a memory device.

The instructions on the computer readable medium further cause the processor to perform steps including determining a web page template to use in creating the model view based upon a characteristic of the content data structure. Further, the instructions can also stop execution of the API request to retrieve content after a predetermined amount of time.

In one example, the instructions on the computer readable medium further cause the processor to perform steps including executing an additional API request to retrieve additional content, retrieving the additional content, converting the retrieved additional content to an additional content data structure, and inserting the additional content data structure in the web page template to create the model view. Further, executing the API request to retrieve content and executing the additional API request to retrieve additional content can be executed in parallel.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive.

DETAILED DESCRIPTION

Figure 1:
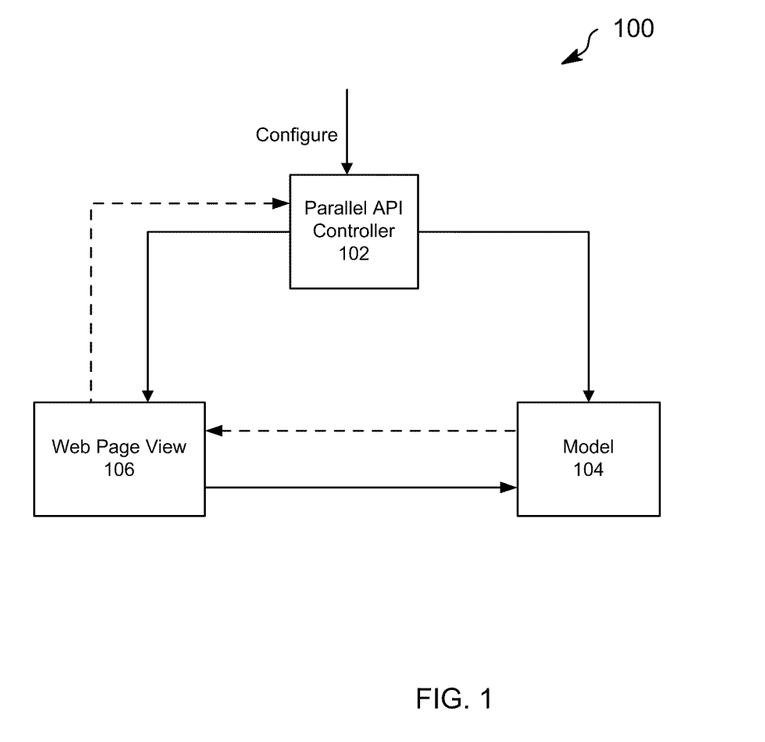
FIG. 1 illustrates an example system with a parallel API client controller for configuring a controller and model to build a combined web page.

In the drawings, like reference numerals designate identical or corresponding parts throughout the figures. FIG. 1 shows an example system 100 with a parallel API client controller 102 in relation to the model 104 and view 106. The parallel API client controller 102 receives configuration input from a developer, initiates a series of calls to APIs, and creates model objects in model 104, which it then passes to the view template(s). Model 104 can be a domain specific representation of the data on which the application operates. The parallel API client controller 102 builds the model 104 required by the view 106. View 106 renders the model into a form, such as a web page, for example, that is suitable for user interaction. In this configuration, business logic is isolated from input and from presentation.

Figure 2:
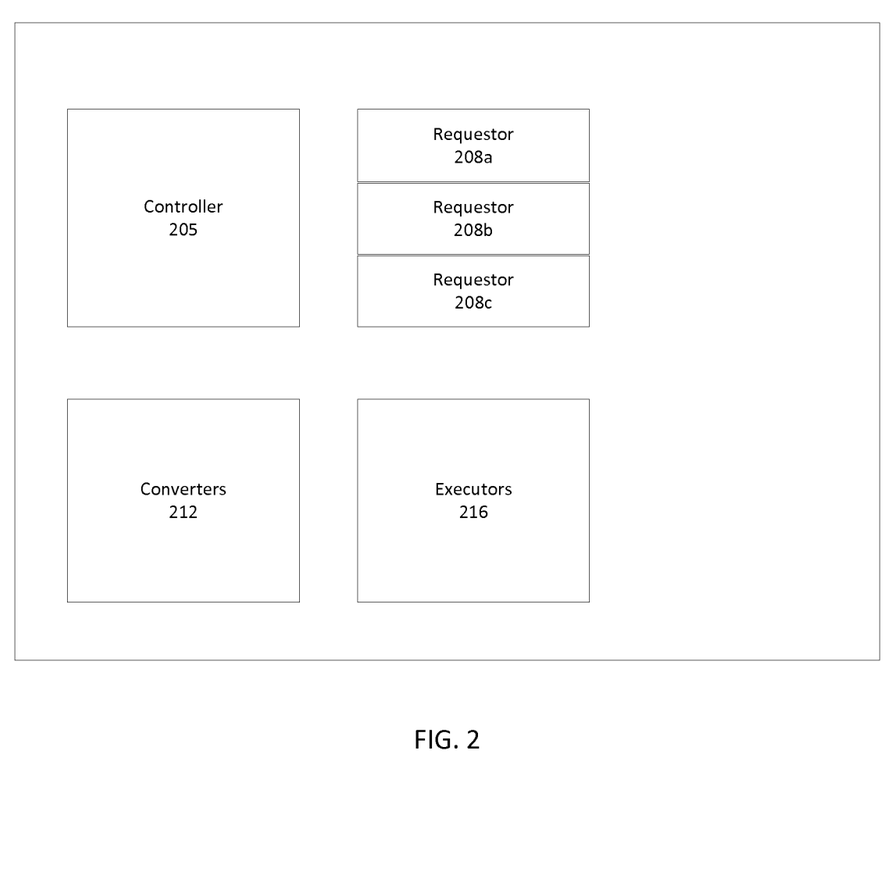
FIG. 2 shows a block diagram of an example parallel API client controller.

FIG. 2 shows an example block diagram of a parallel API client controller 202. The parallel API client controller 202 includes a controller 205, requestors 208a, 208b, 208c, executors 216, and converters 212. Controller 205 is configured to handle requests for a given URI path pattern that matches the URI of the request. For a given controller, multiple sets of executors 216 bound to requestors 208a, 208b, 208c can be mapped to various request URI patterns. Requestors 208a, 208b, 208c are components that can be configured to map to a given API request that should occur. For example, one parallel API client controller will fire a single executor, which may contain multiple levels of child executors, all of which would fire in a non-error case. The parallel API client controller can be configured with either a defaultExecutor or an executorMap. In the former case, the defaultExecutor will fire for all requests to the controller. In the latter case, the executor mapped to the configured executorMapKey will be fired.

A chain of executor context decorators can be configured that will be used by the controller. This will force the controller to use the configured decorators instead of the default list.

Requestors 208a, 208b, 208c can build an API URI from the configured request parameters. Requestors 208a, 208b, 208c then send a request to the API with the built URL and gets response data back. Requestors 208a, 208b, 208c can take the following configuration properties:

name: The name used to identify the requestor. It needs to be unique amongst the requestors used for a given page.

urlBase: The base URL of the request. This value can be optional, as the class can have hard-coded default of the current version of the internal API. By adding this value, however, it is possible to control upgrades between API versions.

resourceName: The path to the REST (representational state transfer) resource being requested.

defaultParams: A map of the API querystring parameters to be included in all requests to the API. The parameter values can be statically configured, or dynamically generated at page-request time from properties of the request context or previous API responses. A missing default parameter value can result in a 404 HTTP page response without a call to the API (see Requestor Parameters).

optionalParams (optional): A map of optional parameters to be checked for at request time. If these parameters exist, they will be included in the API request.

requestorProperties (optional): A list of key/value pairs to be used to change the default behavior of the requestor. An example is shown below in the "Override" section. Another example is query.encode=false which turns off URL encoding on the query parameter.

A sample requestor configuration is shown below:

```
<bean id="techProductRequestorBasic"
class="cnwk.cnetapi.client.web.GenericApiRequestor">
```

```
<property name="name" value="techProdRequest"/>
<propertyname="urlBase"
   value="http://internal.api.tronapi.cnet.com:8766/rest/v1.0"/>
<property name="resourceName" value="/techProductSearch"/>
<property name="defaultParams">
    <map>
        <entry key="categoryId" value="OID:nodeId"/>
        <entry key="partTag" value="tiburonTechProdBasic"/>
    </map>
    </property>
</bean>
```

Each requestor 208a, 208b, 208c has a name associated with it and is statically mapped to a given API request bound to a given URI path. A requestor 208a, 208b, 208c can have both static and dynamic component parameters of the API request mapped to it. The dynamic components are determined at request time based on properties of the request itself, or the results contained in API requests mapped to other requesters invoked previously in the request handling flow. Parameters can have a statically defined default value that will be used, unless a dynamically defined value exists at request-time. In this example, OID: nodeId represents a dynamic parameter value, wherein the nodeId of the request URL's ontology ID will be used.

With the example configuration shown above, if the request URL to the application is this:

http://www.cnet.com/123-6501_7-123.html

Then the resulting API URL executed will be:

http://internal.api.tronapi.cnet.com:8766/rest/v1.0/
techProductSearch?categoryId=6501&partTag=tiburonTechProdBasic The default and optional parameters are ordered by the parameter names when they are added in the API URL. This enables the API server to better implement its caching functionalities.

Executor 216 executes a given action. Executor 216 can be an interface for a component that knows how to execute a given action. Examples of executor implementations include the requestor executors and group executors (not shown separately). Both examples can have sub-types as well. For example, a requestor executor can be a simple requestor executor that fires a single API request, or the requestor executor can be a conditional executor that can evaluate an expression and may or may not execute depending on the result of the evaluation. Group executor sub-types can include a serial executor that contains a group of child executors that fire in series. Additionally, the group executor can include a parallel executor that contains a group of child executors that fire in parallel.

Successful execution of an executor can be either required or optional for successful request processing. This can be determined by its OnFailureAction setting. If a required executor fails, subsequent executors will not be fired, and the application will return an error code, such as a configurable HTTP error code, which is configured in the controller. If an optional executor fails, the controller will ignore it and continue processing subsequent executors, and the request may still return a success state.

The OnFailureAction property of an executor can be:

FAIL: indicates the executor is required, will stop the chain of execution and result in an error state.

CONTINUE: indicates the executor is optional, will not stop the chain of execution RETURN: indicates the executor is required, will force the chain of execution to return immediately.

The OnFailureAction value of a group executor depends on its child executors' OnFailureAction values.

Figure 7:
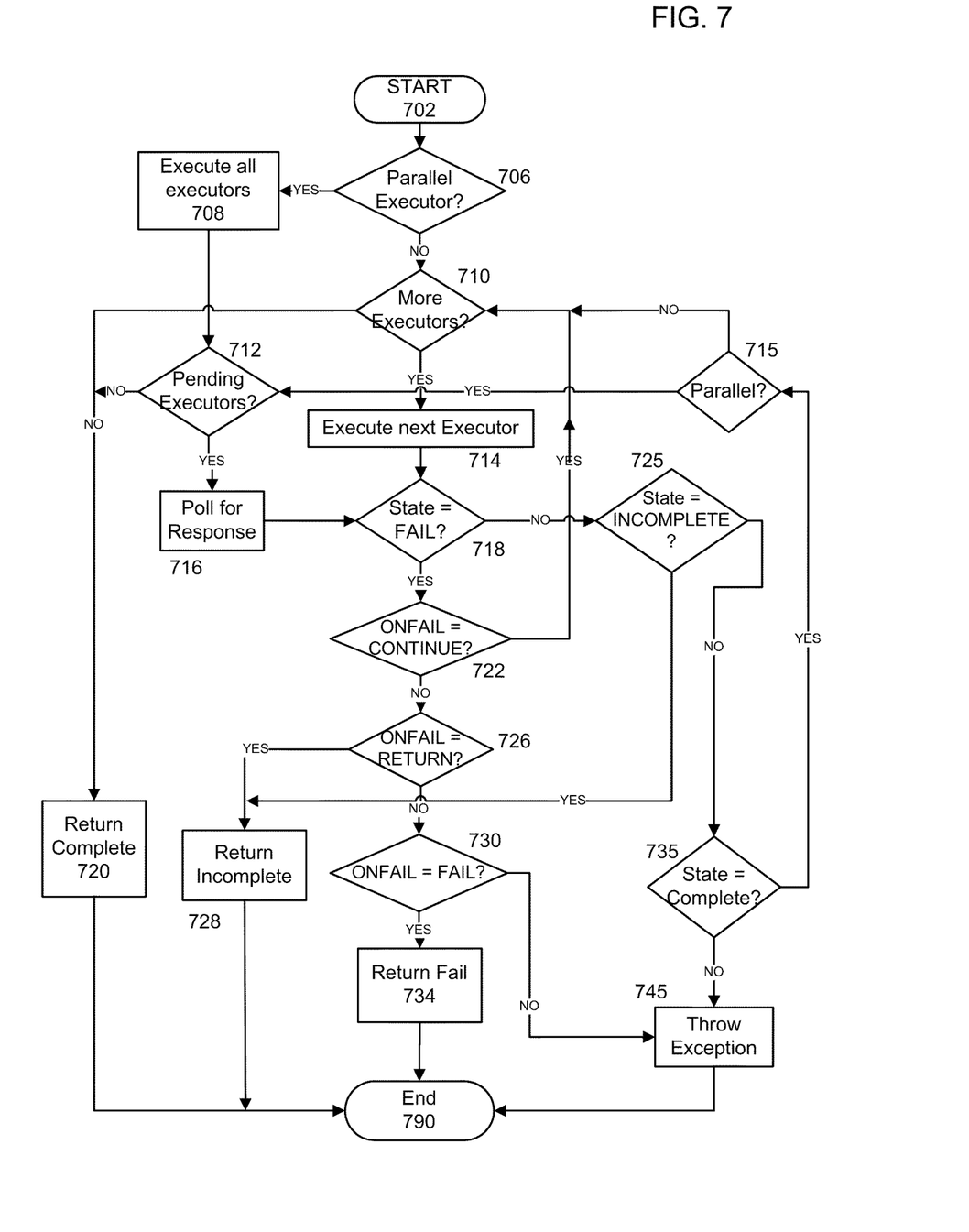
FIG. 7 is a flowchart illustrating an example of a group executor control process.

FIG. 7 is a flowchart illustrating an example of a group executor control process. In this example, a serial group executor is an executor that is configured to fire one or more child executors serially in a configured order. Similarly, a parallel group executor is an executor that is configured to fire one or more child executors in parallel. By combining serial group executors and parallel group executors, the system can configure control flow into the execution of numerous requestor executors. In block 702, the process starts by determining if the group executor being executed is parallel or serial in block 706. If it is a parallel group executor, the process continues to block 708 where all child executors are fired. In block 712, the system checks to determine if pending executors exist that have fired, but have not yet returned. If no pending executors exist, the process continues to block 720 where a complete is returned, and the process ends in block 790.

If, however, there are pending executors that have not yet returned in block 712, the process continues to block 716, and the system polls for a response. If the response state is a fail condition in block 718, the process continues to block 722 where the system determines if the Onfail condition is continue. If the Onfail condition is continue, the process moves to block 710 where the system determines if there are additional executors. If there are no additional executors in block 710, the process continues to block 720 and returns a complete, and the process ends in block 790.

If however, there are additional executors in block 710, the process continues to block 714 where the next executor is executed. In block 718, the state is again determined, and the loop continues until there are no longer any executors in block 710 or the state does not equal fail in block 718 or the Onfail does not equal continue in block 722.

For example, if the state does not equal fail in block 718, the system checks if the state equals incomplete in block 725. If the state equals incomplete in block 725, the process returns an incomplete in block 728, and the process ends in block 790. If, however, the state does not equal incomplete in block 725, the process continues to block 735 where the system determines if the state equals complete. If the state does not equal complete, an exception is thrown in block 745, and the process ends in block 790. If, however, the state equals complete in block 735 the process moves to block 715 to check if another parallel or serial group executor exists. If a parallel group executor exists in block 715, the process moves to block 712 and progresses as described above. If a serial group executor exists in block 715, the process moves to block 710 and progresses as described above.

Once the Onfail does not equal continue in block 722, the process checks to see if the Onfail status is return in block 726. If the Onfail status is return, the process moves to block 728 and returns an incomplete, and the process ends in block 790. If the Onfail does not equal return in block 726, the process moves to block 730 and the system checks if the Onfail condition is fail. If the Onfail condition is fail, a fail is returned in block 734, and the process ends in block 790. If, however, the Onfail does not equal fail, the process moves to block 745 and throws an exception, and the process ends in block 790.

As an example, for a web page that offers products for sale with some reviews of the offered product, a developer can configure that a request should be made to an API to get a given product, followed by a request to get the editor reviews for the product, followed by two parallel requests to get the user reviews and the user comments associated with the product. The first two serial requests could be marked as required with a high timeout setting, while the final two parallel requests could be marked as optional with a low timeout setting. By doing this, the developer implies that the page cannot be rendered without the data from the initial two requests, but the page can also utilize data from the last two requests if it exists. In this example, the developer has configured the first two API requests to be executed in series, since response data from the first request (i.e. the product review id) is needed to build the request of the second request. If that were not the case, they could be configured to be executed in parallel. If the data associated with a non-required request is not in the APIs cache, the request might time out while the data is "pulled" into the cache by the timed-out requester. Subsequent requests to the API for the same data should then respond rapidly.

A requester executor is a wrapper around a requestor. Each requestor executor contains a single API requestor. The requestor executor passes to the requestor what is needed to build the request URL and fires it. In one example, a requestor executor is a component that knows how to make an API request to a given API for a configured requestor. This class determines the values for the dynamic components required by the requestor. The requestor executor can be configured to have a given timeout associated with the API request. The requestor executor will fail if the request to the API server does not return before the configured timeout.

A conditional executor is a special form of requestor executor. A conditional executor knows how to evaluate a key against a value, and based on the evaluation output decides whether to proceed or not. To configure a conditional executor, the conditionKey and conditionValue properties can be set such that the executor only gets executed when the key matches the value. If the value is numeric, a third property condition is used to define the relationship between the key and the value. The conditionKey can be any of the supported requestor parameters. A conditional executor can be either required or optional.

Each requestor executor can be configured with a timeout setting. A global timeout setting in the controller applies to the top-level group executor and can also be set on the controller. During execution, the time permitted for each requestor executor is taken as the minimum of either the requestor executor's configured timeout, or the time remaining until the global timeout is reached.

If the timeout of a single request executor is exceeded, the executor returns a FAILED state. If the overall execution time has exceeded the global timeout, the executor also returns a FAILED state. The executor timeout value is configured in each executor as timeout. The global timeout value is configured in each controller as globalTimeout.

Validators may be used to validate API requests and/or the responses. The API request is checked against a request validator before the execution of the executor. If the result is invalid, the controller will not execute the requestor. A response validator is checked against the API response after the execution but before the response is processed. If the result is invalid, the controller will not add the response to the context. OnFailureActions will be triggered if request or response validation fails.

Request handlers can be added to the controller to add pre/post handling logic. A pre-handler returns either true or false. Returning false indicates that the handling of the request has been completed by the handler. The controller will therefore not continue and will return null. A post-handler may add/modify the ModelAndView object returned by the controller.

As also shown in FIG. 2, converter 212 is a component that knows how to convert the data returned by the API calls to a data structure that can be easily consumed in the web page templates. In one example, the converter 212 is called DomToElMapConverter. It converts the XML DOM returned by the API call into a JAVA™ Map object containing other Maps and Collection of String values. The key-values pairs in the map are structured in a way that the fields can be easily retrieved using Expression Language (EL) in a JAVA™ Server Page (JSP). A convention can be used to allow a developer to easily determine the EL key to use to fetch a given data value if they know: a) the name of the RequestExecutor that made the request; and b) the expected XML returned for the given API request.

Figure 3:
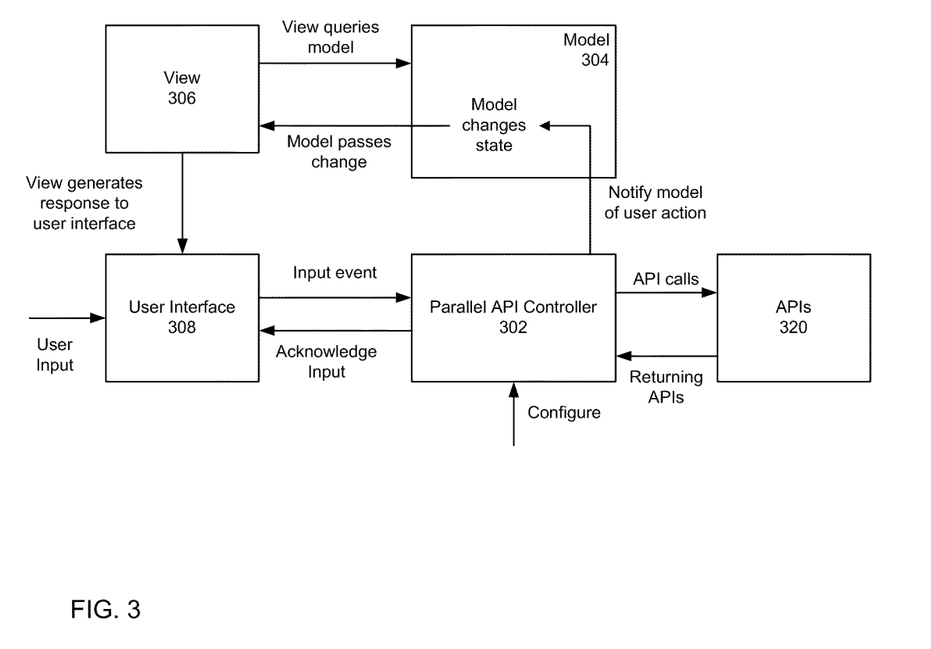
FIG. 3 illustrates an example event sequence of using a controller to build a model required by a view.

In FIG. 3, an example cycle of events is shown illustrating an example method of using a parallel API controller to build the model required by the web page or other content. As shown in FIG. 3, a parallel API client controller 302 is configured to handle an input from a user interface 308. The controller 302 handles the input from the user interface 308 by making an API call and receiving returned API responses from the API storage device 320. The controller then builds the model 304 from the API response data. Of course, in the cases where multiple API responses are called, multiple APIs can be returned to the parallel API controller 320. The model 304 is dynamically created based upon the user action. A view 306 makes calls to the model 304 and receives data from the model 304 in order to generate an appropriate response to the user interface 308. By employing parallel API controller 302, user input may be handled effortlessly by a standardized controller.

Figure 4:
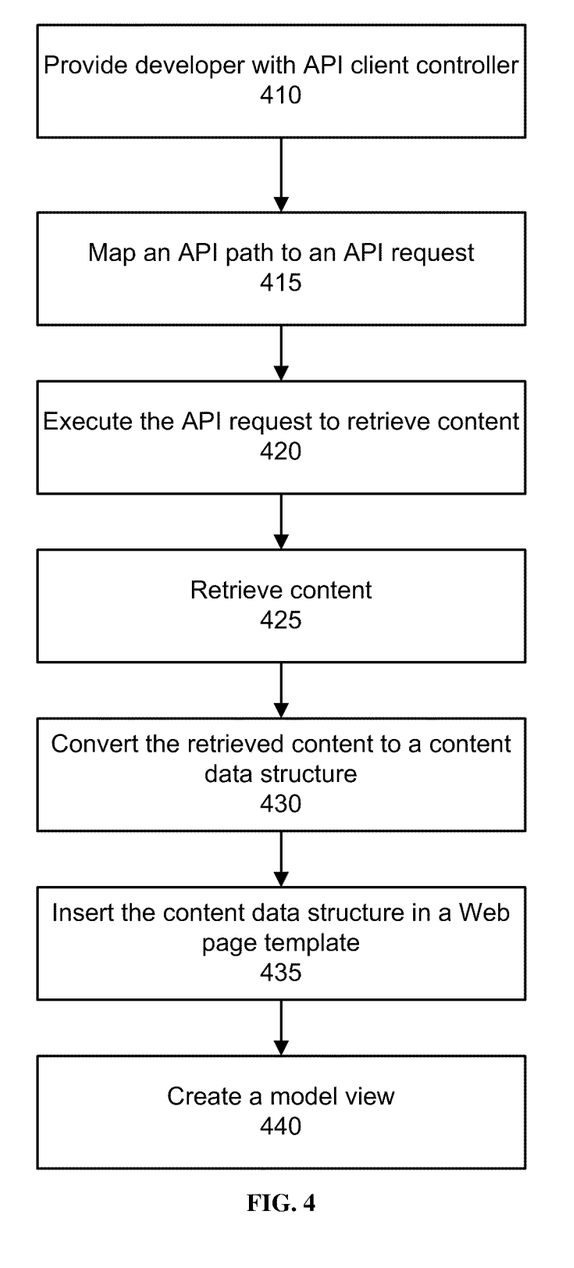
FIG. 4 is a flowchart illustrating an example method of using a controller to build a model required by the web page (view).

Referring to FIGS. 2 and 4, flowchart 400 is shown illustrating an example method of using a parallel API controller 202 to build the model required by the web page (view) or other content. In the examples in this disclosure, "content" refers to any form of text, images, audio, video, or applications, such as data pickers, product finders, language translators, new aggregators, coupon-rebate finders, store locators, direct-response units, and the like, and combinations thereof. Content can be static or dynamic, and can contain text, applications, or any type of digital media, such as images, audio, video, and the like. One example method can be used to build microsites, advertorials, stores, catalogs, widgets, applications, editorial feature, blogs, and the like.

At block 410, a developer is provided with a parallel application program interface (API) client controller 202 to build a model view. A plurality of API paths are provided on an API storage device, such as a host server. The API paths provide a route to content. For example, an API path may include a uniform resource identifier (URI) denoting the location or address of a piece of content. In block 415, an example application program interface client controller 202 employs requestor 208 to map an API path to an API request. In this fashion, when an API request occurs, an API path to the content already exists. An API request may be an API call that pulls data from one location to make use of that data.

In block 420, executor device 216 executes the API request to retrieve content, represented as text response data (e.g. XML, JSON, etc.). The content served by the API may reside in any suitable memory device, such as in a cache, RAM, removable storage device, and the like. The content may also reside in a database, for example. Additionally, the content may reside in a database abstraction layer that unifies communication between application and database programs. In block 425, the content is retrieved. In block 430, converter device 212 converts the retrieved content to a content data structure. For example, the retrieved content may be converted from an XML format to a JAVA™ Map object. In block 435, the content data structure is inserted in a web page (view) template. The web page template used may be determined based upon a characteristic of the content data structure or other factors. In block 440, a model view is created based upon the inserted content data structure and the web page (view) template.

Using the above example, for a web page that offers products for sale with some reviews of the offered product, a developer can configure that a request should be made to an API to get a given product. That is, a developer can map an API path to the given product when an API request for that product is made by a requester device. An additional request can be made to get the editor reviews for the product, followed by two parallel requests to get the user reviews and the user comments associated with the product. Each API path is mapped to the respective API request. Additionally, the developer can specify that these first two (serial) requests should be marked as required with a high timeout setting, while the final two (parallel) requests could be marked as optional with a low timeout setting. That is, execution of the respective API requests can be stopped after a predetermined amount of time. By setting the requests in this fashion, the developer provides the controller with information that the page cannot be rendered without the data from the initial two requests (that is, the product itself and the editor review), but that the page can utilize data from the last two requests (user reviews and user comments) if that content exists. If the data associated with a non-required request is not in the API's cache or other accessible memory, the non-required requests might time out while the data is "pulled" into the cache by the timed-out requester. Subsequent requests to the API for the same data should then respond rapidly.

Once the content is retrieved, the converter device 212 converts the retrieved content to a content data structure suitable for use in a web page (view) template. The web page templates can be located on a host server, stored in a computer readable medium, or otherwise made accessible to the controller. The web page templates can be, for example, themes, visual layouts, text formats, and other template materials accessible, and combinations thereof.

Themes can be designs and styles for the web page that may control such attributes as font, font size, font color, content size, content layout, background color, headings, and the like, and combinations thereof. A user can create his or her own theme via a cascading style sheet (CSS) or other methods. Alternatively, a user can select a CSS design overlay or pre-built design/content page template from a library by selecting pre-built themes. A pre-built theme can be created and added to the library by a user to provide an outline for future web pages, or can be created and added by a user in the process of building a previous web page.

Figure 5A:
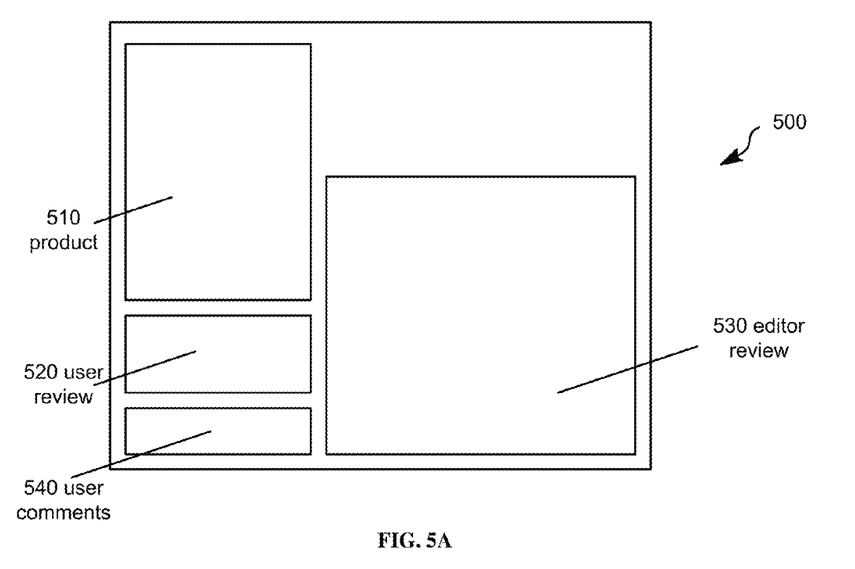
FIG. 5A illustrates an example web page template that can be created using a parallel API client controller.
Figure 5B:
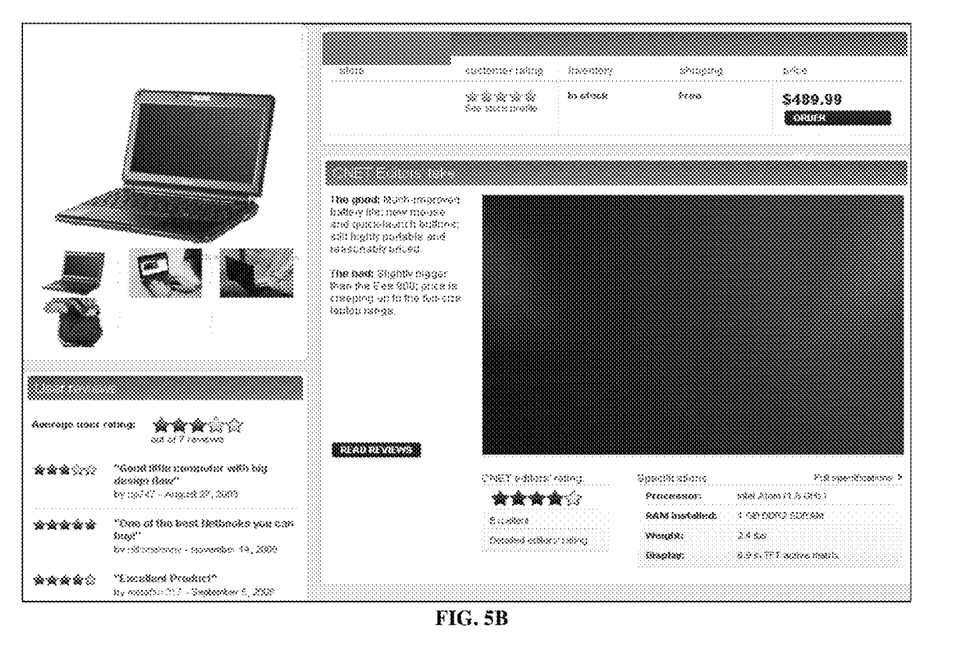
FIG. 5B illustrates an example web page that can be created using a parallel API client controller and the web page template of FIG. 5A.

An example web page template 500 is shown in FIG. 5. As indicated above, a suitable web page template can be selected based upon a characteristic of the content data structure, such as the product, the editor review, or the user review and comments. In the example web page template 500, the product content data structure can be displayed in tile 510, the editor review content data structure can be shown in tile 530, a user review content data structure can be shown in tile 520, and user comments content data structure can be shown in tile 540, for example. Once the content data structures are inserted in a suitable web page template, a model view is created as shown in the example of FIG. 5B.

As indicated above, multiple API requests can be executed to retrieve content. The requests can be executed in a serial fashion, or in a parallel manner. Respective executors are configured to fire serially, or in parallel. By combining serial group executors and parallel group executors, the system can configure control flow into the execution of numerous requestor executors. Once the developer configures how the controller will behave to build the model required by the web page view, future user input events can be serviced efficiently and effectively.

Figure 6:
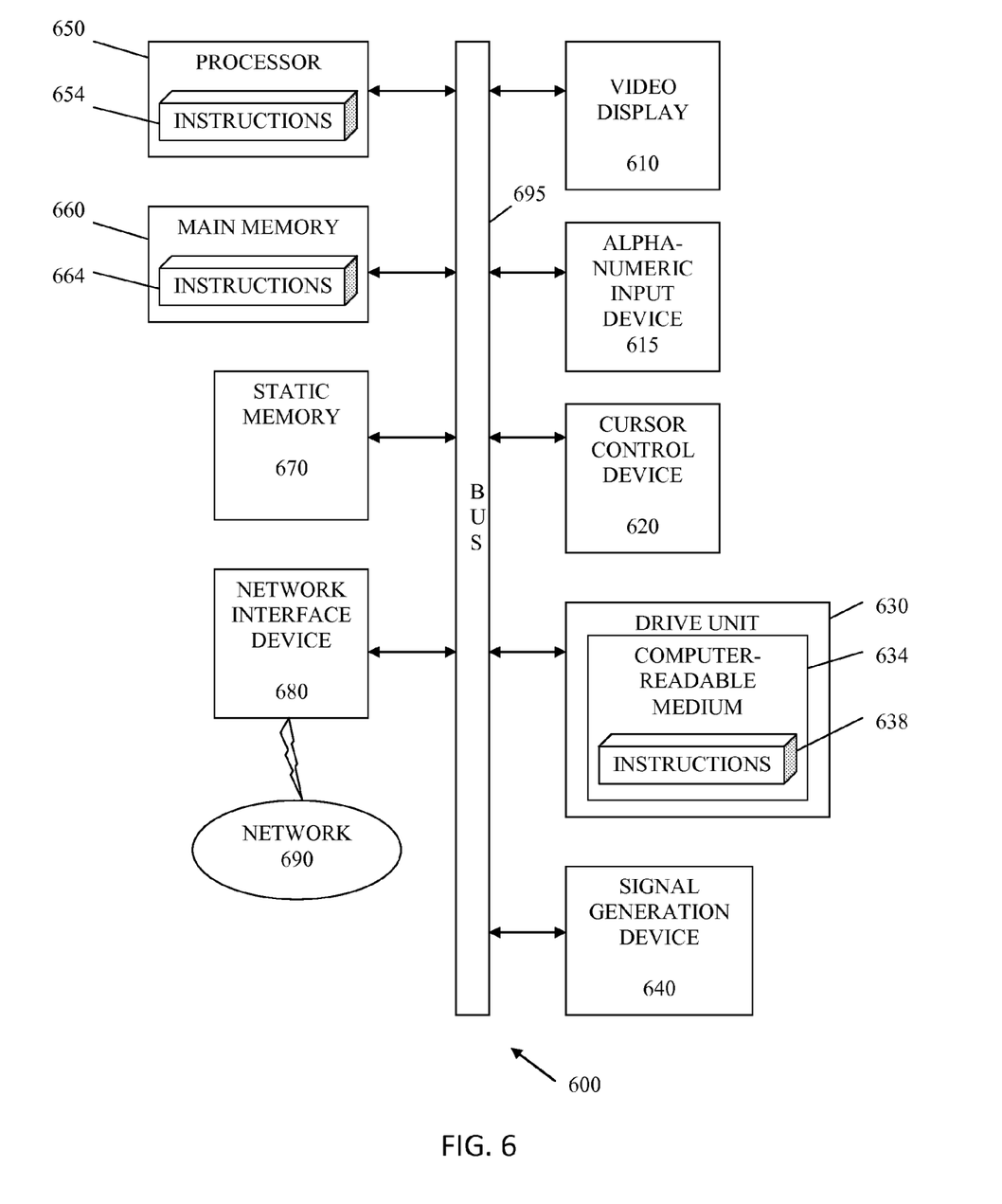
FIG. 6 is a schematic diagram of a computer system capable of housing an example parallel API client controller.

FIG. 6 shows a diagram of an example machine as computer system 600 within which a set of instructions, for causing the machine to perform any one or more of the methodologies discussed herein, can be executed. For example, the machine can operate as a standalone device or can be connected (e.g., networked) to other machines. In a networked deployment, the machine can operate in the capacity of a server or a client machine in server-client network environment, or as a peer machine in a peer-to-peer (or distributed) network environment. The machine can include devices that typically connect using a wired (and/or wireless) communications medium, such as a personal computer (PC), a tablet PC, a set-top box (STB), a Personal Digital Assistant (PDA), a cellular/mobile/smart phone, a web appliance, a network router, switch or bridge, or any machine capable of executing a set of instructions (sequential or otherwise) that specify actions to be taken by that machine. Generally, computer system 600 can include virtually any computing device capable of connecting to another computing device to send and receive information, including web-based information. In one example, the computer system 600 can run web browsers that can provide an interface to make requests to different web server-based applications via the network 690. A series of web-based applications can run on the computer system 600 that allow the transmission of data that is requested by the client computers, for example. The client computers can be further configured to engage in a secure communication with a network traffic management device (not shown) and/or computer system 600 using mechanisms such as Secure Sockets Layer (SSL), Internet Protocol Security (IPSec), Tunnel Layer Security (TLS), and the like.

Further, while only a single machine is illustrated, the term "machine" shall also be taken to include any collection of machines that individually or jointly execute a set (or multiple sets) of instructions to perform any one or more of the methodologies discussed herein.

Computer system 600 can include one or more computing machines capable of operating one or more web-based applications that can be accessed by network devices in the network 690, such as client devices, for example, and can provide other data representing requested resources, such as particular web page(s), image(s) of physical objects, and any other objects, responsive to the requests, although computer system 600 can perform other tasks and provide other types of resources.

Computer system 600 includes processor 650 (e.g., a central processing unit (CPU), a graphics processing unit (GPU) or both), main memory 660 (e.g., read only memory (ROM), flash memory, dynamic random access memory (DRAM) such as synchronous DRAM (SDRAM) or Rambus DRAM (RDRAM), etc.) and static memory 670 (e.g., flash memory, static random access memory (SRAM), etc.), which communicate with each other via bus 695.

Computer system 600 may further include video display unit 610 (e.g., a liquid crystal display (LCD) or a cathode ray tube (CRT)). Computer system 600 also includes alphanumeric input device 615 (e.g., a keyboard), cursor control device 620 (e.g., a mouse), disk drive unit 630, signal generation device 640 (e.g., a speaker), and network interface device 680.

Disk drive unit 630 includes computer-readable medium 634 on which is stored one or more sets of instructions (e.g., software 638) embodying any one or more of the methodologies or functions described herein. Software may also reside, completely or at least partially, within main memory 660, such as instructions 664, and/or within processor 650, such as instructions 654, during execution thereof by computer system 600, main memory 660 and processor 650 also constituting computer-readable media. Software may further be transmitted or received over network 690 via network interface device 680.

While computer-readable medium 634 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

What is claimed is:

1. A computer-implemented method for building a model view with an application program interface (API) client controller, the method executed by one or more computing devices and comprising:
identifying, by the one or more computing devices, an executor to execute in response to a user input;
determining, by the one or more computing devices, whether the executor is a group executor;
identifying, by the one or more computing devices, a plurality of child executors associated with the executor based at least in part on the determination that the executor is a group executor;
executing, by the one or more computing devices, one or more child executors in the plurality of child executors;
retrieving, by the one or more computing devices, content from at least one data source based at least in part on a determination that at least one child executor of the one or more child executors is configured to execute an API request, wherein the content is retrieved via an API path mapped to the API request;
converting, by the one or more computing devices, the retrieved content into at least one content data structure;

inserting, by the one or more computing devices, the at least one content data structure into a web page template to generate a model view corresponding to the user input.

2. The method of claim 1, wherein the step of executing, by the one or more computing devices, the one or more child executors comprises:
determining, by the one or more computing devices, whether the executor is a parallel group executor, wherein the parallel group executor is a group executor type; and
executing, by the one or more computing devices, the one or more child executors in parallel based at least in part on the determination that the executor is a parallel group executor.

3. The method of claim 1, wherein the step of executing, by the one or more computing devices, the one or more child executors comprises:
determining, by the one or more computing devices, whether the executor is a series group executor, wherein the series group executor is a group executor type; and
executing, by the one or more computing devices, the one or more child executors in series based at least in part on the determination that the executor is a series group executor.

4. The method of claim 3, further comprising:
executing, by the one or more computing devices, a first child executor in the one or more child executors;
detecting, by the one or more computing devices, a failure of the first child executor; and
executing, by the one or more computing devices, a second child executor in the one or more child executors based at least in part on a determination that the first child executor is optional.

5. The method of claim 1, wherein the step of converting, by the one or more computing devices, the retrieved content into the at least one content data structure includes converting the at least one content data structure from an extensible markup language (XML) format to a map object containing one or more key-value pairs.

6. The method of claim 1, wherein the at least one child executor configured to execute the API request has an associated timeout setting, the associated timeout setting indicating how long to wait for the content retrieval before marking the executor as failed.

7. The method of claim 1, wherein the web page template used for generating the model view is determined based at least in part on a characteristic of the at least one content data structure.

8. The method of claim 1, wherein the at least one child executor configured to execute the API request has an associated condition and further comprising:
executing, by the one or more computing devices, the API request based at least in part on a determination that the associated condition is fulfilled.

9. The method of claim 1, further comprising:
retrieving, by the one or more computing devices, additional content from an additional data source based at least in part on a determination that an additional child executor in the one or more child executors is configured to execute an additional API request, wherein the additional content is retrieved via an additional API path mapped to the additional API request;
converting, by the one or more computing devices, the retrieved additional content into an additional content data structure; and
inserting, by the one or more computing devices, the additional content data structure into the web page template.

10. The method of claim 9, wherein the content and the additional content are retrieved in parallel.

11. A system for building a model view with an application program interface (API) client controller, the system comprising:
one or more processors; and
one or more memories operatively coupled to the one or more processors and having instructions stored thereon that, when executed by the one or more processors, cause the one or more processors to:
identify an executor to execute in response to a user input;
determine whether the executor is a group executor;
identify a plurality of child executors associated with the executor based at least in part on the determination that the executor is a group executor;
execute one or more child executors in the plurality of child executors;
retrieve content from at least one data source based at least in part on a determination that at least one child executor of the one or more child executors is configured to execute an API request, wherein the content is retrieved via an API path mapped to the API request;
convert the retrieved content into at least one content data structure; and
insert the at least one content data structure into a web page template to generate a model view corresponding to the user input.

12. The system of claim 11, wherein the instructions that, when executed by the one or more processors, cause the one or more processors to execute the one or more child executors further cause the one or more processors to:
determine whether the executor is a parallel group executor, wherein the parallel group executor is a group executor type; and
execute the one or more child executors in parallel based at least in part on the determination that the executor is a parallel group executor.

13. The system of claim 11, wherein the instructions that, when executed by the one or more processors, cause the one or more processors to execute the one or more child executors further cause the one or more processors to:
determine whether the executor is a series group executor, wherein the series group executor is a group executor type; and
execute the one or more child executors in series based at least in part on the determination that the executor is a series group executor.

14. The system of claim 13, wherein at least one of the one or more memories has further instructions stored thereon that, when executed by at least one of the one or more processors, cause at least one of the one or more processors to:
execute a first child executor in the one or more child executors;
detect a failure of the first child executor; and
execute a second child executor in the one or more child executors based at least in part on a determination that the first child executor is optional.

15. The system of claim 11, wherein the instructions that, when executed by the one or more processors, cause the one or more processors to convert the retrieved content into the at least one content data structure further cause the one or more processors to convert the at least one content data structure from an extensible markup language (XML) format to a map object containing one or more key-value pairs.

16. The system of claim 11, wherein the at least one child executor configured to execute the API request has an associated timeout setting, the associated timeout setting indicating how long to wait for the content retrieval before marking the executor as failed.

17. The system of claim 11, wherein the web page template used for generating the model view is determined based at least in part on a characteristic of the at least one content data structure.

18. The system of claim 11, wherein the at least one child executor configured to execute the API request has an associated condition and wherein at least one of the one or more memories has further instructions stored thereon that, when executed by the one or more processors, cause the one or more processors to:
execute the API request based at least in part on a determination that the associated condition is fulfilled.

19. The system of claim 11, wherein at least one of the one or more memories has further instructions stored thereon that, when executed by the one or more processors, cause the one or more processors to:
retrieve additional content from an additional data source based at least in part on a determination that an additional child executor in the one or more child executors is configured to execute an additional API request, wherein the additional content is retrieved via an additional API path mapped to the additional API request;
convert the retrieved additional content into an additional content data structure; and
insert the additional content data structure into the web page template.

20. The system of claim 19, wherein the content and the additional content are retrieved in parallel.

21. At least one non-transitory computer-readable medium storing computer-readable instructions that, when executed by one or more computing devices, cause the one or more computing devices to:
identify an executor to execute in response to a user input;
determine whether the executor is a group executor;
identify a plurality of child executors associated with the executor based at least
in part on the determination that the executor is a group executor;
execute one or more child executors in the plurality of child executors;
retrieve content from at least one data source based at least in part on a determination that at least one child executor of the one or more child executors is configured to execute an application program interface (API) request, wherein the content is retrieved via an API path mapped to the API request;
convert the retrieved content into at least one content data structure; and
insert the at least one content data structure into a web page template to generate a model view corresponding to the user input.

22. The at least one non-transitory computer-readable medium of claim 21, wherein the instructions that, when executed by the one or more computing devices, cause the one or more computing devices to execute the one or more child executors further cause the one or more computing devices to:
determine whether the executor is a parallel group executor, wherein the parallel group executor is a group executor type; and
execute the one or more child executors in parallel based at least in part on the determination that the executor is a parallel group executor.

23. The at least one non-transitory computer-readable medium of claim 21, wherein the instructions that, when executed by the one or more computing devices, cause the one or more computing devices to execute the one or more child executors further cause the one or more computing devices to:
determine whether the executor is a series group executor, wherein the series group executor is group executor type; and
execute the one or more child executors in series based at least in part on the determination that the executor is a series group executor.

24. The at least one non-transitory computer-readable medium of claim 21, further storing computer-readable instructions that, when executed by the one or more computing devices, cause the one or more computing devices to:
execute a first child executor in the one or more child executors;
detect a failure of the first child executor; and
execute a second child executor in the one or more child executors based at least in part on a determination that the first child executor is optional.

25. The at least one non-transitory computer-readable medium of claim 21, wherein the instructions that, when executed by the one or more computing devices, cause the one or more computing devices to convert the retrieved content into the at the least one content data structure further cause the one or more computing devices to convert the at least one content data structure from an extensible markup language (XML) format to a map object containing one or more key-value pairs.

26. The at least one non-transitory computer-readable medium of claim 21, wherein the at least one child executor configured to execute the API request has an associated timeout setting, the associated timeout setting indicating how long to wait for the content retrieval before marking the executor as failed.

27. The at least one non-transitory computer-readable medium of claim 21, wherein web page template used for generating the model view is determined based at least in part on a characteristic of the at least one content data structure.

28. The at least one non-transitory computer-readable medium of claim 21, wherein the at least one child executor configured to execute the API request has an associated condition and further storing computer-readable instructions that, when executed by the one or more computing devices, cause the one or more computing devices to:
execute the API request based at least in part on a determination that the associated condition is fulfilled.

29. The at least one non-transitory computer-readable medium of claim 21, further storing computer-readable instructions that, when executed by the one or more computing devices, cause the one or more computing devices to:
retrieve additional content from an additional data source based at least in part on a determination that an additional child executor in the one or more child executors is configured to execute an additional API request, wherein the additional content is retrieved via an additional API path mapped to the additional API request;
convert the retrieved additional content into an additional content data structure; and
insert the additional content data structure into the web page template.

30. The at least one non-transitory computer-readable medium of claim 21, wherein the content and the additional content are retrieved in parallel.

* * * * *